United States Patent
Lee et al.

(10) Patent No.: US 10,055,408 B2
(45) Date of Patent: Aug. 21, 2018

(54) METHOD OF EXTRACTING AN IMPORTANT KEYWORD AND SERVER PERFORMING THE SAME

(71) Applicant: LG CNS CO., LTD., Seoul (KR)

(72) Inventors: Seen Tae Lee, Seoul (KR); Hyun Pyo Kim, Seoul (KR); Jae Man Kim, Seoul (KR); Sun Min Yun, Seoul (KR); Cho Rong Yoon, Seoul (KR); Yoo Jin Chang, Seoul (KR); In Chul Jung, Seoul (KR); Tae Chang Jee, Seoul (KR)

(73) Assignee: LG CNS CO., LTD., Seoul (KR)

( * ) Notice: Subject to any disclaimer, the term of this patent is extended or adjusted under 35 U.S.C. 154(b) by 782 days.

(21) Appl. No.: 14/516,449

(22) Filed: Oct. 16, 2014

(65) Prior Publication Data

US 2015/0134652 A1    May 14, 2015

(30) Foreign Application Priority Data

Nov. 11, 2013 (KR) .................. 10-2013-0136564

(51) Int. Cl.
*G06F 17/30* (2006.01)

(52) U.S. Cl.
CPC .. *G06F 17/30011* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 6,212,517 B1* | 4/2001 | Sato | G06F 17/30616 707/749 |
| 2004/0049499 A1* | 3/2004 | Nomoto | G06F 17/30654 |
| 2005/0137723 A1* | 6/2005 | Liu | G09B 7/00 700/45 |
| 2007/0208744 A1* | 9/2007 | Krishnaprasad | G06F 21/6227 |
| 2007/0244881 A1* | 10/2007 | Cha | G06F 17/30663 |
| 2008/0222095 A1* | 9/2008 | Il | G06F 17/30696 |
| 2008/0270389 A1* | 10/2008 | Jones | G06F 17/30648 |
| 2011/0078148 A1* | 3/2011 | Lung | G06F 17/30622 707/741 |
| 2011/0082878 A1* | 4/2011 | Nozaki | G06F 17/3064 707/769 |
| 2011/0246464 A1* | 10/2011 | Okamoto | G06F 17/30014 707/737 |

(Continued)

*Primary Examiner* — Dung K Chau

(57) ABSTRACT

A method of extracting an important keyword by an important keyword extracting server, the method includes receiving a set of one or more documents from a network, receiving one or more user defined keywords from a user terminal, calculating, by the server, a relative importance value for each of words detected in the set of documents, determining, by the server, a weight for each of the words based on the one or more user defined keywords, applying, by the server, the weight for each of the words to the relative importance value for each of the words, determining, by the server, at least one of the words to be the important keyword based on the relative importance value to which the weight is applied and transmitting, by the server, the important keyword to the user terminal. Therefore, the method may effectively detect a user defined keyword from at least one document.

16 Claims, 8 Drawing Sheets

(56) References Cited

U.S. PATENT DOCUMENTS

2011/0295612 A1* 12/2011 Donneau-
                              Golencer ............... G06Q 30/02
                                                          705/1.1
2014/0046976 A1* 2/2014 Zhang ............... G06F 17/30483
                                                          707/772

* cited by examiner

| USER DEFINED KEYWORD | WEIGHT |
|---|---|
| EVENT | 1.1 |
| JAVA | 1.7 |
| KEYWORD | 0.7 |
| PATENT | 1.3 |

| | PATENT | KEYWORD | EVENT | MEASUREMENT | KOREA | JAVA | BANK | SEOUL |
|---|---|---|---|---|---|---|---|---|
| IMPORTANCE OF MORPHEME | 0.012035 | 0.041032 | 0.005965 | 0.066545 | 0.0090383 | 0.011701 | 0.039841 | 0.005123 |

FIG. 6

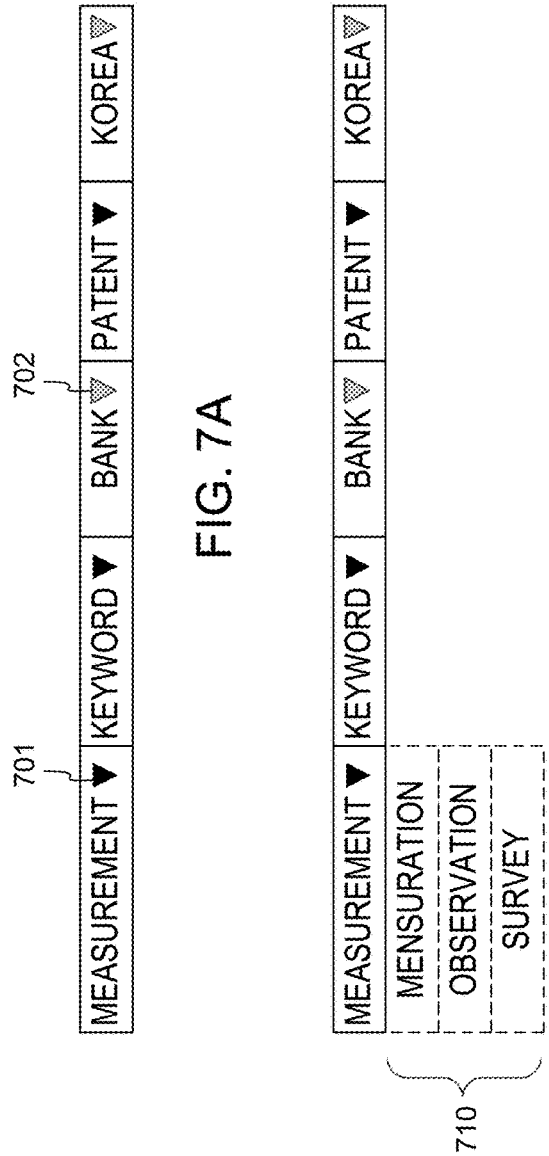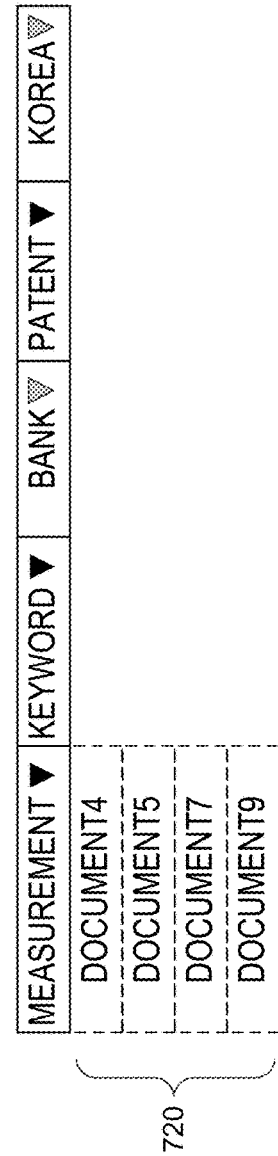
FIG. 7A
FIG. 7B
FIG. 7C

METHOD OF EXTRACTING AN IMPORTANT KEYWORD AND SERVER PERFORMING THE SAME

CROSS-REFERENCE TO RELATED APPLICATIONS

Pursuant to 35 U.S.C. § 119(a), this application claims the benefit of earlier filing date and right of priority to Korean Patent Application No. 10-2013-0136564, filed on Nov. 11, 2013, the contents of which are hereby incorporated by reference herein in their entirety.

BACKGROUND

Technical Field

Embodiments of the present disclosure relate to computer executable technology of extracting an important keyword, and more particularly, to a method of extracting an important keyword from one or more documents and a server performing the same.

Description of the Related Art

Keyword analysis uses a pattern matching technique to analyze the contents of a sentence. In a keyword analysis process, a keyword may be determined based on the subjective experience of an analyzer and then matched up with a search keyword in a search of a target document.

Because the keyword analysis of the related art uses a word subjectively selected by the analyzer as an important word, the keyword analysis may not use a keyword that is actually important in the target document.

SUMMARY

Embodiments of the present disclosure are directed to a method of effectively extracting an important keyword from at least one document based on user defined keywords.

Embodiments of the present disclosure are directed to a method of extracting an important keyword by determining the relative importance of words detected in at least one document and applying weights of user defined keywords to the relative importance of the words.

Embodiments of the present disclosure are directed to a method of extracting an important keyword and provide a user with at least one keyword list including the important keyword.

In some embodiments, a method of extracting an important keyword by an important keyword extracting server includes receiving a set of one or more documents from a network, receiving one or more user defined keywords from a user terminal, calculating, by the server, a relative importance value for each of words detected in the set of documents, determining, by the server, a weight for each of the words based on the one or more user defined keywords, applying, by the server, the weight for each of the words to the relative importance value for each of the words, determining, by the server, at least one of the words to be the important keyword based on the relative importance value to which the weight is applied and transmitting, by the server, the important keyword to the user terminal.

In one embodiment, calculating the relative importance value may include determining an initial importance value of a specific word detected in one or more specific documents by performing an arithmetic operation on the number of times the specific word occurs in the one or more specific documents and the number of all words included in the one or more documents including the one or more specific documents.

Calculating the relative importance value may further include determining a ratio of the number of the one or more specific documents including the specific word to the total number of the one or more documents and wherein the relative importance value is calculated by performing an arithmetic operation on the initial importance value of the specific word and the ratio.

Determining the weight for each of the words may further include storing the one or more user defined keywords and corresponding weights for the one or more user defined keywords from the user terminal in a database, searching for at least one word in the set of documents that is matched up with at least one user defined keyword, searching for a corresponding weight for the at least one user defined keyword that is matched up with the at least one word and determining the weight for each of the words based on the corresponding weight for the at least one user defined keyword.

In one embodiment, searching for the at least one word may include searching for the at least one word based on abbreviations of the words detected in the set of documents.

In one embodiment, the method may further include analyzing morphemes of words in the one or more documents and detecting words including nouns based on a result of the morpheme analysis. Herein, the nouns may include a common noun, a proper noun and a compound noun.

In one embodiment, the one or more user defined keywords may include a group keyword composed of a plurality of keywords.

In one embodiment, the method may further include receiving weights for the one or more user defined keywords from the user terminal and storing the one or more user defined keywords and the weights for the one or more user defined keywords in a database.

In one embodiment, the method may further include calculating relative importance values of the one or more user defined keywords, determining weights for the one or more user defined keywords based on the calculated relative importance values of the one or more user defined keywords and storing the one or more user defined keywords and the weights for the one or more user defined keywords in a database.

In one embodiment, the method may further include detecting a word similar to the one or more user defined keywords from the words detected in the set of documents and storing the similar word in a memory.

Determining the at least one of the words to be the important keyword may further comprise determining at least one of the words having a weighted relative importance value, which is equal to or higher than a predetermined value, to be the important keyword.

The method may further comprise receiving a request including information on the number of keywords requested by a user from the user terminal and wherein transmitting the important keyword includes transmitting important keywords corresponding to the number of keywords to the user terminal.

In some embodiments, a system includes a processor, a non-transitory computer-readable medium having stored thereon instructions that, when executed, cause the processor to perform a method, the method comprises calculating a relative importance value for each of words detected in one or more documents, comparing each of the words with one or more user defined keywords, applying a weight for at least one user defined keyword to a relative importance value of at least one of the words if the at least one of the words is matched up with the at least one user defined keyword, determining at least one of the words having a high importance value as an important keyword and transmitting the important keyword to a user terminal.

In one embodiment, calculating the relative importance value may comprise determining an initial importance value of a specific word detected in one or more specific documents by performing an arithmetic operation on the number of times the specific word occurs in the one or more specific documents and the number of all words included in the one or more documents including the one or more specific documents, determining a ratio of the number of the one or more specific documents to the number of the one or more documents and calculating a relative importance value for each of the words by performing an arithmetic operation on the initial importance value of the specific word and the ratio.

In one embodiment, the method may further comprise analyzing morphemes of words included in the one or more documents and detecting words including nouns based on a result of the morpheme analysis.

Comparing each of the words may further comprise determining which words have a high relative importance value among the words detected in the one or more documents and comparing the words having the high relative importance value with the one or more user defined keywords.

In one embodiment, the method may further comprise receiving a request including information on the number of keywords requested by a user from the user terminal and wherein transmitting the important keyword includes transmitting important keywords corresponding to the number of keywords to the user terminal.

In some embodiments, a non-transitory computer-readable medium having stored thereon computer-executable instructions that, when executed by a processor, performs a method, the method includes calculating a relative importance value for each of words detected in one or more documents, comparing each of the words with one or more user defined keywords and applying a weight for at least one user defined keyword to a relative importance value of at least one of the words to determine an importance value of the at least one of the words if the at least one of the words is matched up with the at least one user defined keyword, determining at least one of the words having a high importance value as an important keyword and transmitting the important keyword to a user terminal.

In one embodiment, calculating the relative importance value may comprise determining an initial importance value of a specific word detected in one or more specific documents by performing an arithmetic operation on the number of times the specific word occurs in the one or more specific documents and the number of all words included in the one or more documents including the one or more specific documents, determining a ratio of the number of the one or more specific documents to the number of the one or more documents and calculating a relative importance value for each of the words by performing an arithmetic operation on the initial importance value of the specific word and the ratio.

Embodiments of the present disclosure may effectively detect an important keyword in at least one document.

Embodiments of the present disclosure may determine the relative importance of a word detected in at least one document and apply a weight of a user defined keyword to the relative importance of the detected word to find an important keyword.

Embodiments of the present disclosure may provide at least one keyword list including an important keyword determined based on the importance of words detected in at least one document.

BRIEF DESCRIPTION OF THE DRAWINGS

FIG. 6 illustrates the calculated importance of morphemes.

FIGS. 7A to 7C illustrate keyword lists.

DETAILED DESCRIPTION

Descriptions of embodiments provide structural or functional explanations of various features, so the scope of the present disclosure should not be construed to be limited to the embodiments described herein. That is, since embodiments may be implemented in several forms without departing from the characteristics thereof, it should be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are intended to be embraced by the appended claims.

Terms described in the present disclosure may be understood as follows. Singular forms (e.g., "a" and "an") in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps or operations are used for the sake of explanation and are not intended to limit embodiments to any particular order. The order of respective operations may be changed from the described order unless context indicates a specific order.

The terms used in the present disclosure are merely used to describe particular embodiments, and are not intended to be limiting. Unless otherwise defined, all terms used herein, including technical or scientific terms, have the same meanings as those generally understood by those of ordinary skill in the field of art to which the present disclosure belongs. Such terms as those defined in a generally used dictionary are to be interpreted to have meanings consistent with the contextual meanings in the relevant field of art, and are not to be interpreted to have ideal or excessively formal meanings, unless clearly indicated in the present application.

Figure 1:
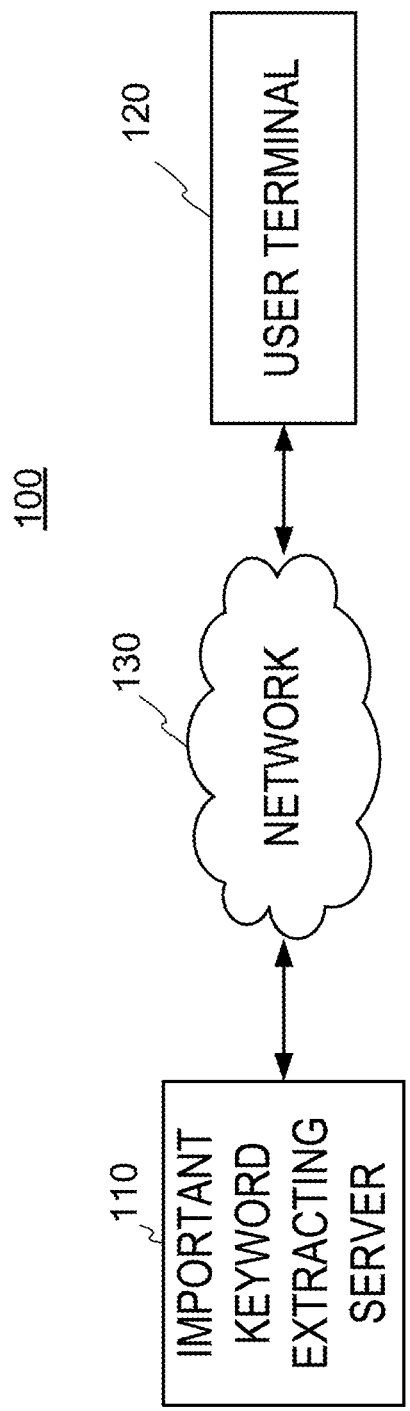
FIG. 1 is a block diagram illustrating an important keyword extracting system according to an embodiment of the present disclosure.

FIG. 1 is a block diagram illustrating an important keyword extracting system according to an embodiment of the present disclosure.

Referring to FIG. 1, the important keyword extracting system 100 includes an important keyword extracting server 110 and a user terminal 120.

The important keyword extracting server 110 may receive one or more keywords defined by a user, i.e., user defined keywords, from the user terminal 120 through an online network 130. Herein, the important keyword extracting server 110 may be implemented as a plurality of distributed computing devices or a single computing device. The user defined keywords may include search terms the user inputs to determine which words are important.

The important keyword extracting server 110 may detect words in one or more documents and determine the importance of each of the words, and may provide one or more of the detected words to the user terminal 120 according to the importance of each of the detected words.

The user terminal 120 may be linked with the important keyword extracting server 110 and communicate with the important keyword extracting server 110, through the network 130. The user terminal 120 may be a computing device, such as a PC (Personal Computer), smartphone, PDA (Personal Digital Assistant) or tablet PC, which includes a CPU (Central Processing Unit), a memory device and input/output devices. For illustrative convenience, FIG. 1 shows a single user terminal. However, in some embodiments, more than one user terminal may communicate with one important keyword extracting server 110.

The user terminal 120 may receive at least one word having high relative importance from the important keyword extracting server 110. The user terminal 120 may provide a user's input, which is received from the user through the input device, to the important keyword extracting server 110 and may output a response therefor to the user through the output device.

Figure 2:
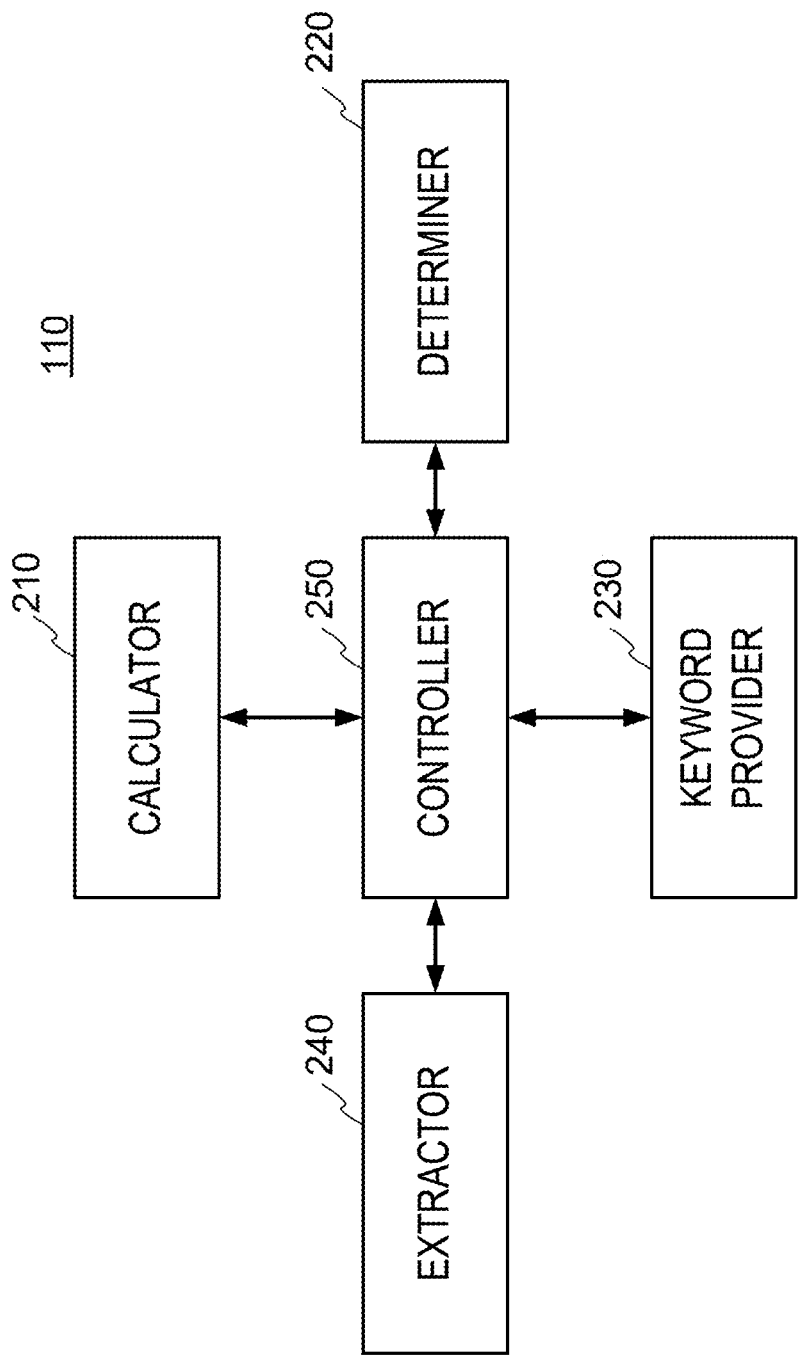
FIG. 2 is a block diagram illustrating an important keyword extracting server according to an embodiment of the present disclosure.

FIG. 2 is block diagram illustrating an important keyword extracting server 110A in accordance with an embodiment of the present disclosure.

Referring to FIG. 2, the important keyword extracting server 110A includes a relative importance calculator 210, a word importance determiner 220, a keyword provider 230, a word extractor 240 and a controller 250.

The relative importance calculator 210 calculates the relative importance of each of the words detected in one or more documents.

The relative importance calculator 210 may receive information on the one or more documents from a user through the user terminal 120 and the network 130. In an embodiment, the documents may correspond to records that are searchable on the Internet or on another network, such as webpages, blogs, homepages, twitter feeds or other social media sites including advertisements and information on a product, and the like. This application may be applied to a document stored in a database.

The relative importance calculator 210 may determine the initial importance of a specific word detected in one or more specific documents by performing an arithmetic operation on the number of times the specific word occurs in the specific documents and the number of all words included in the all of the documents including the one or more specific documents. For example, the initial importance of the specific word detected in the specific documents may be determined by a value obtained by dividing the number of times the specific word occurs in the specific documents by the total number of words included in the all of the documents. Thus, in an embodiment, assuming there is a set of documents, any given word may occur only in specific documents, but not in others. The initial importance of this word corresponds to the value obtained by dividing the number of times the word occurs in the specific documents by the total number of words in the entire set of documents, including the documents that do not include the word.

After that, the relative importance calculator 210 may determine the ratio of the specific documents including the specific word to the total number of documents by performing an arithmetic operation on the number of the specific documents including the specific word and the total number of documents. The ratio of the specific documents including the specific word to the total number of documents may correspond to the value obtained by dividing the number of the specific documents by the total number of documents.

The relative importance calculator 210 may calculate the relative importance of the specific word by performing an arithmetic operation on the value corresponding to the initial importance of the specific word and the ratio of the specific documents including the specific word to the total number of documents. The relative importance of the specific word correspond to a value obtained by dividing the value indicating the initial importance of the specific word by the value corresponding to the ratio of the specific documents including the specific word.

The word importance determiner 220 compares each of the words detected in the one or more documents with user defined keywords and applies a weight for at least one user defined keyword to at least one of the words to determine the weighted importance of the words.

The word importance determiner 220 may detect a word similar to at least one user defined keyword from the words detected in the one or more documents and temporarily store the similar word in a memory. In an embodiment, the memory stores at least one similar word detected in the one or more documents and deletes the similar word after a specific time passes. In another embodiment, the memory stores at least one similar word detected in the one or more documents and deletes all of the similar words stored therein when another set of one or more documents is received.

The word importance determiner 220 may search a keyword database based on abbreviations of the words detected in the one or more documents to compare each of the words with the user defined keywords stored in the keyword database. The word importance determiner 220 may search the keyword database based on the abbreviations of the words to decrease a search time. However, embodiments are not limited thereto. For example, if the words are in Korean, the word importance determiner 220 may search the keyword database based on consonants of the words.

In an embodiment, if there is, in the keyword database, no user defined keyword corresponding to a specific word detected in the one or more documents, the word importance determiner 220 may determine that the relative importance of the specific word calculated by the relative importance calculator 210 is the weighted importance of the specific word.

If there is found, in the keyword database, a user defined keyword corresponding to the specific word, the word importance determiner 220 may assign a weight for the user defined keyword to the specific word. Herein, the weight may be implemented as a decimal.

In an embodiment, the word importance determiner 220 may receive user defined keywords and weights for the user defined keywords from the user, and sort the user defined keywords in alphabetical order. The sorted user defined keywords and the weights for the user defined keywords are stored in the keyword database.

In another embodiment, if only the user defined keywords are received from the user, but the weights therefor are not received, the word importance determiner 220 may analyze the relative importance of the user defined keywords to determine the weights for the user defined keywords, and then may sort the user defined keywords in alphabetical order and store the user defined keywords and the weights for the user defined keywords in the keyword database.

The word importance determiner 220 may set a weight range for the user defined keywords and measure whether the weights for the user defined keywords are within the weight range. If the weights for the user defined keywords are not within the weight range, the word importance determiner 220 may adjust the weights for the user defined keywords to be within the weight range.

In an embodiment, the user defined keywords may be a single keyword composed of one keyword or a group keyword composed of a plurality of keywords. For example, a single keyword may include a single word, e.g., PATENT, JAVA, EVENT, or KEYWORD and a group keyword may include at least two words, e.g., CLASSIC MUSIC, TEST SCHEDULE, or SONG LYRICS].

The keyword provider 230 provides the user with one or more keywords selected from the words, which are detected in the one or more documents, according to the weighted importance of the words. The keyword provider 230 may provide a keyword list including the one or more keywords determined according to the weighted importance of the words to the user. Herein, the keyword provider 230 may sort the one or more keywords according to the weighted importance of the keywords and provide the keyword list including the sorted keywords as important keywords.

The keyword provider 230 may receive a request including information on the number of keywords requested by the user from the user and provide important keywords corresponding to the number of keywords requested by the user to the user as a response to the request of the user.

The word extractor 240 may analyze morphemes of words included in the one or more documents and extract words including nouns based on the morpheme analysis result. Herein, the noun may include at least one of a common noun, proper noun and compound noun.

In an embodiment, the word extractor 240 may analyze the morphemes of the words included in the one or more documents using a morpheme analyzer. For example, the word extractor 240 may analyze the morphemes of the words based on a lexical morpheme and a grammatical morpheme. The lexical morpheme corresponds to a morpheme where an individual definition is listed in a dictionary. For example, in "my mother just hates me", the lexical morphemes thereof may be analyzed as [mother], [hate], [just] and [i]. The grammatical morpheme assists in giving meaning to a specific word, assigns a case such as, e.g., a nominative case or objective case to the specific word, puts the specific word at an adnominal phrase position, changes a verb or adjective to a noun, or expresses a preterit. For example, in "my mother just hates me", the grammatical morphemes thereof may be analyzed as [my], [-s] and [me].

The word extractor 240 may store the words extracted from the one or more document in a database. Each of the extracted words may be stored to be associated with information on a corresponding document from which each of the words is extracted. The database may be physically separate from or combined with the keyword database.

The controller 250 may control all operations of the important keyword extracting server 110A. In particular, the controller 250 may control a signal (e.g., command) flow and/or a data flow among the relative importance calculator 210, the word importance determiner 220, the keyword provider 230 and the word extractor 240.

Figure 3:
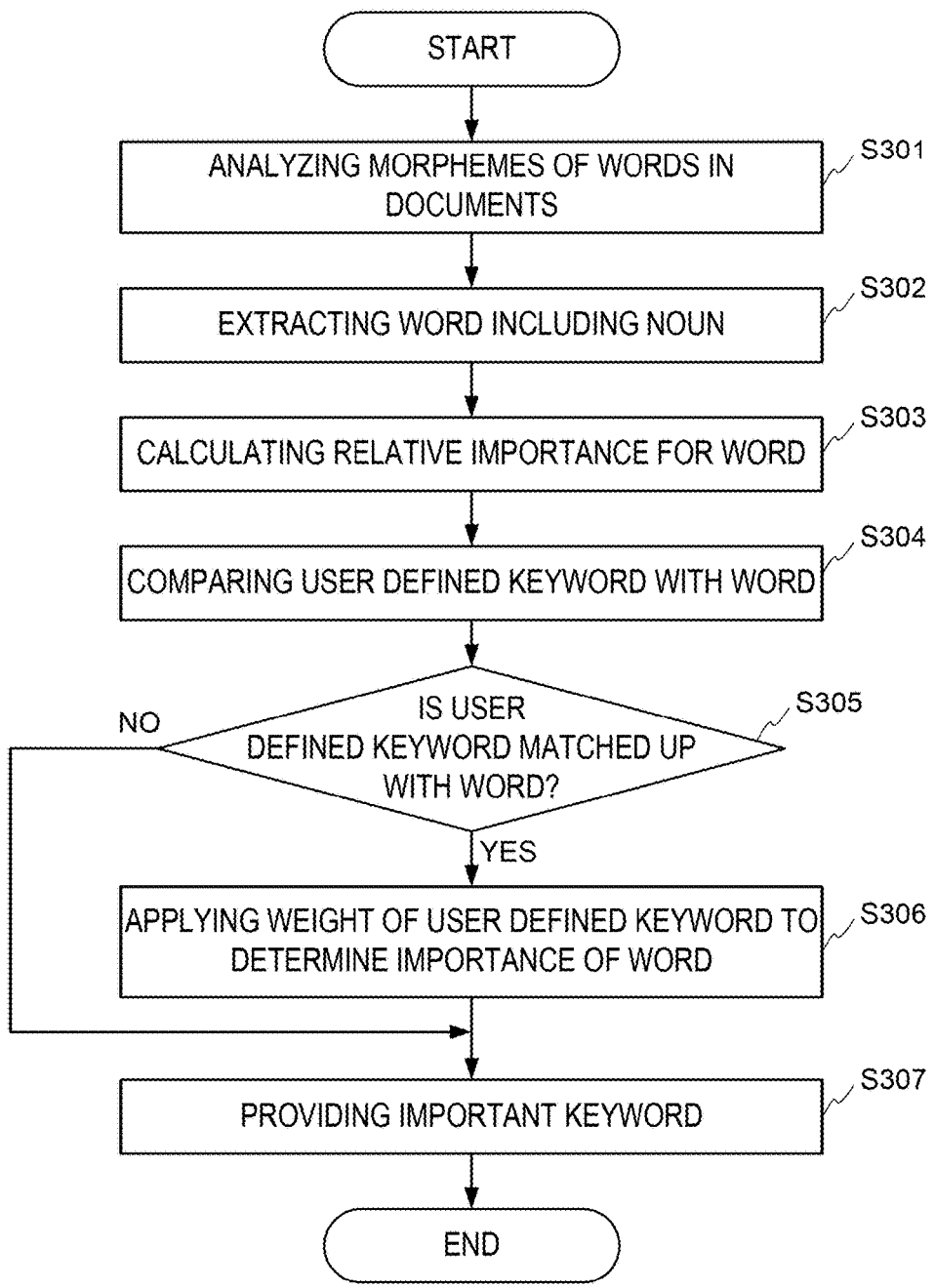
FIG. 3 is a flowchart illustrating an important keyword extracting procedure according to an embodiment of the present disclosure.

FIG. 3 is a flowchart illustrating an important keyword extracting procedure in accordance with an embodiment. The important extracting procedure will be described with reference to the important keyword extracting server 110A shown in FIG. 2.

Referring to FIG. 3, the word extractor 240 analyzes morphemes of words included in one or more documents and extracts words including nouns based on the results of morpheme analysis (S301 and S302).

The relative importance calculator 210 calculates relative importance for each of the words detected in the one or more document (S303).

In an embodiment, the relative importance calculator 210 may determine the initial importance of a specific word detected in one or more specific documents of the one or more documents by performing an arithmetic operation on the number of times the specific word occurs in the one or more specific documents and the total number of words included in all of the documents. For example, when the number of times [PATENT] occurs in document 1 is 5 and the total number of words included in all of the one or more documents is 5125, the initial importance of [PATENT] detected in document 1 may be determined to be about 0.0009756 (5/5125).

The relative importance calculator 210 may determine the ratio of the one or more specific documents including the specific word to the total number of the one or more documents by performing an arithmetic operation on the number of the one or more specific documents and the total number of the one or more documents. For example, when the number of the specific documents including [PATENT] is 4 and the total number of documents is 10, the ratio of the specific documents including [PATENT] to the total number of documents may be determined to be 0.25 (4/10).

The relative importance calculator 210 may calculate relative importance for each of the words detected in the one or more documents by performing an arithmetic operation on the value corresponding to the initial importance of the specific word and the ratio of the specific documents including the specific word. For example, when the value corresponding to the initial importance of [PATENT] detected in the specific documents is about 0.0009756 and the ratio of the specific documents including [PATENT] to the total number of documents is 0.25, the relative importance for [PATENT] may be determined to be 0.003902 (0.0009756/0.25).

Figures 5A, 5B:
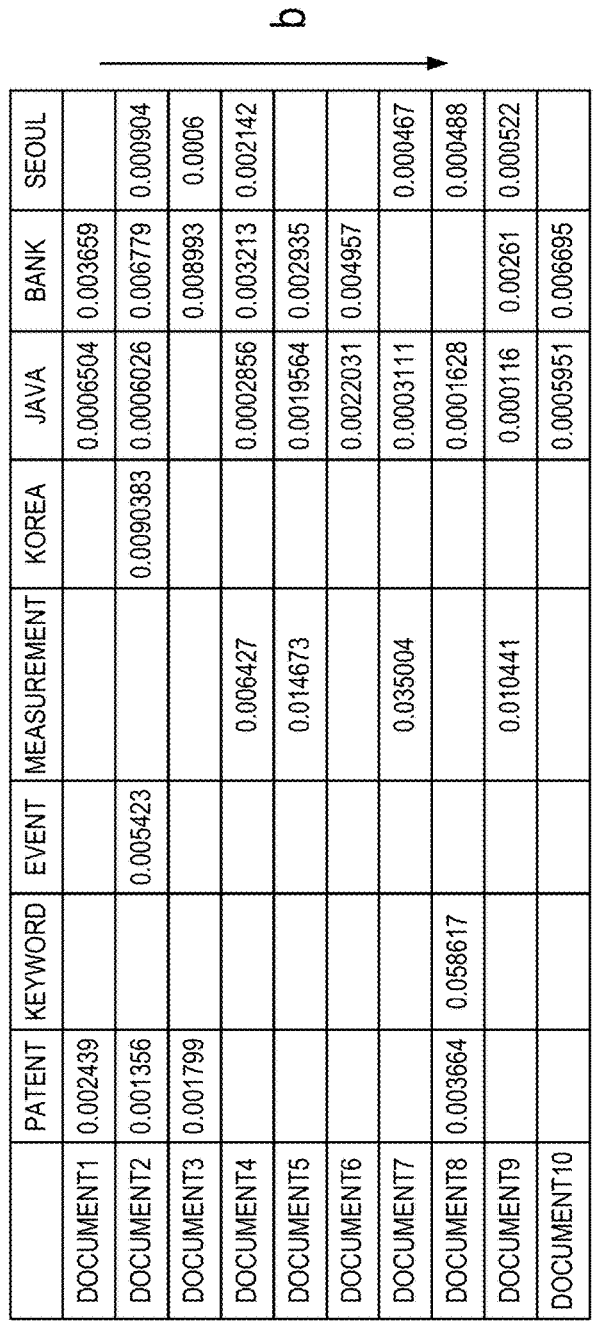
FIGS. 5A and 5B illustrate the relative importance of morphemes.

FIG. 5A illustrates the relative importance for each of [PATENT], [KEYWORD], [EVENT], [MEASUREMENT], [KOREA], [JAVA], [BANK] and [SEOUL] detected in each of documents, e.g., document 1 through document 10, and FIG. 5B illustrates the relative importance for each of [PATENT], [KEYWORD], [EVENT], [MEASUREMENT], [KOREA], [JAVA], [BANK] and [SEOUL] detected in all of the documents, e.g., document 1 through document 10. The relative importance calculator 210 may calculate the relative importance of [PATENT] in the set of one or more documents by summing the value for the relative importance of [PATENT] in each of documents 1 through 10 along a direction b in FIG. 5A. The relative importance calculator 210 may calculate the relative importance of [KEYWORD] in the set of one or more documents by summing the value for the relative importance of [KEYWORD] in each of documents 1 through 10 along the direction b in FIG. 5A. The relative importance calculator 210 may continue to calculate the relative importance of keywords with respect to all of the one or more documents until the relative importance of the last keyword, in this example, [SEOUL], has been calculated. A summation result of the relative importance in FIG. 5A is shown in FIG. 5B.

Referring back to FIG. 3, after the process of S303 is completed, the word importance determiner 220 compares each of words having high relative importance with user defined keywords stored in a keyword database (S304). In an embodiment, if a specific word has a relative importance value that is equal to or higher than a predetermined value, the specific word is determined to be a word having high relative importance. In another embodiment, a predetermined number of specific words having higher relative importance values than other words are determined to be words having high relative importance. The predetermined number may correspond to the number of keywords requested by a user.

When at least one of the user defined keywords is matched up with at least one of the words having high relative importance, the word importance determiner 220 may apply a weight for the at least one user defined keyword, which is stored in the keyword database, to the matched word thus determining a weight of the matched word (S305 and S306).

The word importance determiner 220 may determine the weighted importance of [PATENT], [KEYWORD], [EVENT], [MEASUREMENT], [KOREA], [JAVA], [BANK] and [SEOUL] by performing an arithmetic operation on, e.g., multiplying, the relative importance of [PATENT], [KEYWORD], [EVENT], [MEASUREMENT], [KOREA], [JAVA], [BANK] and [SEOUL] and the weights for [PATENT], [JAVA], [EVENT] and [KEYWORD] obtained based on the weights for the user defined keywords stored in the keyword database. FIG. 6 shows the weighted importance of [PATENT], [KEYWORD], [EVENT], [MEASUREMENT], [KOREA], [JAVA], [BANK] and [SEOUL] determined as a result of processes of S305 and S306.

Figure 4:
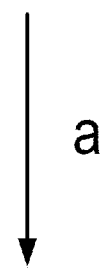
FIG. 4 illustrates weights for user defined keywords.

In an embodiment, when the user defined keywords and the weights for the user defined keywords are received from the user, the important keyword extracting system 100 sorts the user defined keywords in alphabetical order and stores the sorted user defined keywords and their weights in the keyword database. For example, when [PATENT, JAVA, EVENT and KEYWORD] and the weight [1.3, 1.7, 1.1 and 0.7] are received from the user, the word importance determiner 220 sorts [PATENT, JAVA, EVENT and KEYWORD] in alphabetical order and stores the sorted user defined keywords in order of [EVENT, JAVA, KEYWORD and PATENT] and the weight [1.1, 1.7, 0.7 and 1.3] in the keyword database in the direction a, as shown in FIG. 4.

In another embodiment, when the user defined keywords are received from the user, the important keyword extracting system 100 may analyze the relative importance of the user defined keywords to determine the weights for the user defined keywords, and then may sort the user defined keywords in alphabetical order and store the sorted user defined keyword and their weights in the keyword database. In some embodiments, the weights for the user defined keywords may be determined based on the frequency of word(s) detected in the past or based on the intention of the user.

In an embodiment, the word importance determiner 220 may analyze lexical semantics for words detected in the one or more documents to detect words similar to the at least one user defined keyword. For example, when a user defined keyword corresponds to [KEYWORD], the word importance determiner 220 may analyze the lexical semantics for the words detected in the one or more documents and detect [KEY POINT], which is similar to [KEYWORD], as a similar word to [KEYWORD].

The word importance determiner 220 searches the keyword database based on abbreviations of the words detected in the one or more documents to compare the user defined keywords stored in the keyword database with each of the words. For example, when [EVENT], [JAVA], [KEYWORD] and [PATENT] are stored in the keyword database and [PATENT, KEYWORD, EVENT, MEASUREMENT, KOREA, JAVA, BANK and SEOUL] are detected in the one or more documents, the word importance determiner 220 may search the keyword database based on the abbreviation [P] for [PATENT] to determine whether the word [PATENT] is included in the keyword database.

Referring back to FIG. 3, the keyword provider 230 provides at least one of the words determined according to the weighted importance of the words to the user as an important keyword (S307).

The keyword provider 230 may receive a request including information on the number of keywords requested by the user from the user and provide the user with keywords corresponding to the number of keywords requested by the user. For example, as shown in FIG. 7A, when 5 keywords are requested from the user, the keyword provider 230 may provide the user with 5 keywords [MEASUREMENT], [KEYWORD], [BANK], [PATENT] and [KOREA] having high relative importance. As shown in FIG. 7B, when a triangle-shaped indicator disposed at right side of the keyword [MEASUREMENT] in the keyword list is triggered by the user, the keyword provider 230 may provide [MENSURATION], [OBSERVATION] and [SURVEY], which are words similar to [MEASUREMENT], using a combo box 710. Herein, an activated triangle-shaped indicator, designated by reference numeral 701, indicates that a similar word exists and an inactivated triangle-shaped indicator, designated by reference numeral 702, indicates that similar words do not exist. In another embodiment, as shown in FIG. 7C, when the activated triangle-shaped indicator disposed at the right side of the word [MEASUREMENT] in the keyword list is triggered by the user, the keyword provider 230 may provide information on the documents where [MEASUREMENT] is detected using a combo box 720. In yet another embodiment, two different indicators may be disposed near a keyword. In this embodiment, if both indicators are activated, one indicator, when triggered, indicates similar words, and another indicator, when triggered, indicates the documents in which the keyword appears.

Figure 8:
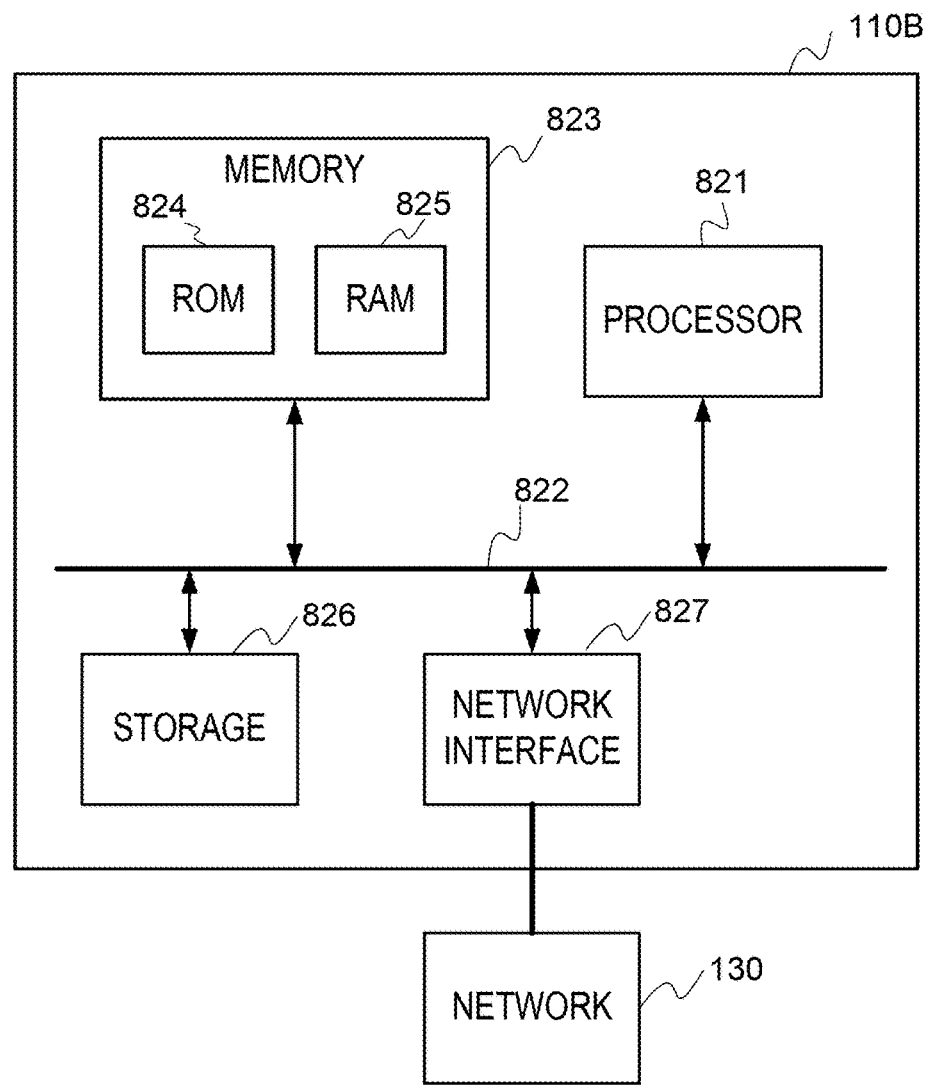
FIG. 8 illustrates a simplified view of an important keyword extracting server accordance with an embodiment of the present disclosure.

FIG. 8 illustrates a simplified view of an important keyword extracting server 110B in accordance with an embodiment of the present disclosure.

The important keyword extracting server 110B includes a processor or CPU 821 that is in communication with a variety of other components via a bus 822. Such other components of the important keyword extracting server 110B include, but are not limited to, a non-transitory computer readable storage medium as a memory 823, including a read only memory (ROM) 824 and a random access memory (RAM) 825, and also a higher capacity non-transitory computer readable storage medium 826 that acts as a local database.

One or more of these components may be employed by the important keyword extracting server 110B to store computer code including instructions for extracting important keywords.

The important keyword extracting server 110B also includes a network interface element 827. This network interface element 827 is configured to allow information to be communicated between the important keyword extracting server 110B and the network 130. Such information may include the code that is executable on the important keyword extracting server 110B and one or more documents, a request, user defined keywords and weights for the user defined keywords from the user terminal 120, and so on.

The processor 821 may perform methods in accordance with embodiments, such as those described with reference to FIGS. 2 to 7C, in cooperation with other components illustrated in FIG. 8.

In accordance with embodiments of the present disclosure, the foregoing methods may be implemented as computer-readable code that can be read and executed by a computer and stored on a non-transitory computer-readable medium. The computer-readable medium may include any type of recording device in which data that can be read by a computing system is stored. Examples of the computer-readable recording medium include a read-only memory (ROM), a random access memory (RAM), a compact disk-read only memory (CD-ROM), a magnetic tape, a floppy disk, and optical data storage. The computer-readable medium may be distributed over network-coupled computer systems so that the computer-readable code may be stored and executed in a distributed fashion.

In another embodiment, one or more of other components such as input/output device may be employed by the important keyword extracting server 110B.

Although this document provides descriptions of embodiments of the present invention, it would be understood by those skilled in the art that embodiments can be modified or changed in various ways without departing from the technical principles and scope defined by the appended claims.

What is claimed is:

1. A method of extracting an important keyword by an important keyword extracting server, the method comprising:

receiving a set of one or more documents from a network;

receiving one or more user defined keywords from a user terminal, the one or more user defined keywords including search terms input by a user;

calculating, by the server, a relative importance value for each of words detected in the set of documents;

determining, by the server, a weight for each of the words based on weights for the one or more user defined keywords;

applying, by the server, the weight for each of the words to the relative importance value for each of the words;

determining, by the server, at least one of the words to be the important keyword based on the relative importance value to which the weight is applied; and transmitting, by the server, the important keyword to the user terminal, wherein the weights for the one or more user defined keywords are determined based on the frequency of each of the one or more user defined keywords detected in a previous search or based on the intention of the user, and wherein the calculating of the relative importance value comprises:

determining an initial importance value of a specific word detected in one or more specific documents by performing an arithmetic operation on a number of times the specific word occurs in the one or more specific documents and a number of all words included in the one or more documents including the one or more specific documents;

determining a ratio of a number of the one or more specific documents to a number of the one or more documents; and calculating the relative importance value for each of the words by performing an arithmetic operation on the initial importance value of the specific word and the ratio.

2. The method of claim 1, wherein the determining of the weight for each of the words further includes:

storing the one or more user defined keywords and the weights for the one or more user defined keywords from the user terminal in a database;

searching for at least one word in the set of documents that is matched up with at least one user defined keyword;

searching for a corresponding weight for the at least one user defined keyword that is matched up with the at least one word; and determining the weight for each of the words based on the corresponding weight for the at least one user defined keyword.

3. The method of claim 2, wherein the searching for at least one word includes searching for the at least one word based on abbreviations of the words detected in the set of documents.

4. The method of claim 1, further comprising:

analyzing, by the server, morphemes of words in the one or more documents; and detecting, by the server, words including nouns based on a result of the morpheme analysis.

5. The method of claim 4, wherein the nouns include a common noun, a proper noun and a compound noun.

6. The method of claim 1, wherein the one or more user defined keywords includes a group keyword composed of a plurality of keywords.

7. The method of claim 1, further comprising:

receiving the weights for the one or more user defined keywords from the user terminal; and storing the one or more user defined keywords and the weights for the one or more user defined keywords in a database.

8. The method of claim 1, further comprising:

calculating, by the server, relative importance values of the one or more user defined keywords;

determining, by the server, the weights for the one or more user defined keywords based on the calculated relative importance values of the one or more user defined keywords; and storing the one or more user defined keywords and the weights for the one or more user defined keywords in a database.

9. The method of claim 1, further comprising:

detecting, by the server, a word similar to the one or more user defined keywords from the words detected in the set of documents; and storing the similar word in a memory.

10. The method of claim 1, wherein the determining of the at least one of the words to be the important keyword further comprises:

determining at least one of the words having a weighted relative importance value, which is equal to or higher than a predetermined value, to be the important keyword.

11. The method of claim 1, further comprising receiving a request including information on a number of keywords requested by the user from the user terminal,
wherein transmitting the important keyword includes transmitting important keywords corresponding to the number of keywords to the user terminal.

12. A system, comprising:
a processor; and
a non-transitory computer-readable medium having stored thereon instructions that, when executed, cause the processor to perform a method, the method comprising:
receiving one or more documents from a network;
receiving one or more user defined keywords from a user terminal, the one or more user defined keywords including search terms input by a user;
calculating a relative importance value for each of words detected in the one or more documents;
comparing each of the words with the one or more user defined keywords;
applying a weight for at least one user defined keyword to the relative importance value of at least one of the words to determine an importance value of the at least one of the words when the at least one of the words is matched up with the at least one user defined keyword;
determining at least one of the words having a high importance value as an important keyword; and
transmitting the important keyword to the user terminal,
wherein the weight for the at least one user defined keyword is determined based on the frequency of the at least one user defined keyword detected in a previous search or based on the intention of the user, and
wherein the calculating of the relative importance value comprises:
determining an initial importance value of a specific word detected in one or more specific documents by performing an arithmetic operation on a number of times the specific word occurs in the one or more specific documents and a number of all words included in the one or more documents including the one or more specific documents;
determining a ratio of a number of the one or more specific documents to a number of the one or more documents; and
calculating the relative importance value for each of the words by performing an arithmetic operation on the initial importance value of the specific word and the ratio.

13. The system of claim 12, wherein the method further comprises:
analyzing morphemes of words included in the one or more documents; and
detecting words including nouns based on a result of the morpheme analysis.

14. The system of claim 12, wherein the comparing each of the words further comprises:
determining which words have a high relative importance value among the words detected in the one or more documents; and
comparing the words having the high relative importance value with the one or more user defined keywords.

15. The system of claim 12, wherein the method further comprises receiving a request including information on a number of keywords requested by the user from the user terminal, and
wherein transmitting the important keyword includes transmitting important keywords corresponding to the number of keywords to the user terminal.

16. A non-transitory computer-readable medium having stored thereon computer-executable instructions that, when executed by a processor, performs a method, the method comprising:
receiving one or more documents from a network;
receiving one or more user defined keywords from a user terminal, the one or more user defined keywords including search terms input by a user;
calculating a relative importance value for each of words detected in the one or more documents;
comparing each of the words with the one or more user defined keywords and applying a weight for at least one user defined keyword to the relative importance value of at least one of the words to determine an importance value of the at least one of the words when the at least one of the words is matched up with the at least one user defined keyword;
determining at least one of the words having a high importance value as an important keyword; and
transmitting the important keyword to the user terminal,
wherein the weight for the at least one user defined keyword is determined based on the frequency of the at least one user defined keyword detected in a previous search or based on the intention of the user, and
wherein the calculating of the relative importance value comprises:
determining an initial importance value of a specific word detected in one or more specific documents by performing an arithmetic operation on a number of times the specific word occurs in the one or more specific documents and a number of all words included in the one or more documents including the one or more specific documents;
determining a ratio of a number of the one or more specific documents to a number of the one or more documents; and
calculating the relative importance value for each of the words by performing an arithmetic operation on the initial importance value of the specific word and the ratio.

* * * * *